(12) United States Patent
Takao

(10) Patent No.: US 12,179,631 B2
(45) Date of Patent: Dec. 31, 2024

(54) MANAGEMENT DEVICE AND POWER SUPPLY SYSTEM

(71) Applicant: Panasonic Intellectual Property Management Co., Ltd., Osaka (JP)

(72) Inventor: Hiroshi Takao, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 43 days.

(21) Appl. No.: 18/001,675

(22) PCT Filed: Jun. 16, 2021

(86) PCT No.: PCT/JP2021/022957
§ 371 (c)(1),
(2) Date: Dec. 13, 2022

(87) PCT Pub. No.: WO2021/261360
PCT Pub. Date: Dec. 30, 2021

(65) Prior Publication Data
US 2023/0219460 A1 Jul. 13, 2023

(30) Foreign Application Priority Data
Jun. 26, 2020 (JP) ................. 2020-110619

(51) Int. Cl.
H02J 7/00 (2006.01)
B60L 50/60 (2019.01)
(Continued)

(52) U.S. Cl.
CPC ............... B60L 58/22 (2019.02); B60L 50/60 (2019.02); B60L 58/13 (2019.02);
(Continued)

(58) Field of Classification Search
CPC ........ H05B 45/37; H05B 47/19; H05B 47/18; H02J 1/00; H02J 1/08; H02J 5/00; H02M 7/04
See application file for complete search history.

(56) References Cited

U.S. PATENT DOCUMENTS 11,554,687 B2 * 1/2023 Mukae ................. H02J 7/02
2011/0234006 A1 9/2011 Deng et al.
(Continued)

FOREIGN PATENT DOCUMENTS

JP 2009-033936 2/2009
WO 2012/164630 12/2012

OTHER PUBLICATIONS

International Search Report of PCT application No. PCT/JP2021/022957 dated Aug. 10, 2021.
(Continued)

Primary Examiner — Jared Fureman
Assistant Examiner — Esayas G Yeshaw
(74) Attorney, Agent, or Firm — Rimon P.C.

(57) ABSTRACT

Management device manages a plurality of power storage modules connected in parallel to load via switches. With some of switches connected to some of the plurality of power storage modules being in an on state and other switches connected to other power storage modules being in an off state, determination unit of management device does not permit at least one of other switches in the off state to be turned on in a case where at least one switch is turned on and an upper limit value of a current or power allowed to be supplied to load entirely from the plurality of power storage modules with at least one switch being turned on becomes less than or equal to a value before the turning-on of at least one switch.

7 Claims, 7 Drawing Sheets

(51) Int. Cl.
    *B60L 58/13*        (2019.01)
    *B60L 58/22*        (2019.01)
    *H01M 10/42*       (2006.01)
    *H01M 50/512*      (2021.01)

(52) U.S. Cl.
    CPC ....... *H01M 10/425* (2013.01); *H01M 50/512* (2021.01); *H02J 7/0013* (2013.01); *H02J 7/0048* (2020.01); *H02J 7/00712* (2020.01); *H01M 2010/4271* (2013.01)

(56) References Cited

U.S. PATENT DOCUMENTS

| | | | | |
|---|---|---|---|---|
| 2012/0268070 | A1* | 10/2012 | Park | H01M 10/441 |
| | | | | 320/126 |
| 2014/0103859 | A1 | 4/2014 | Nishi | |
| 2018/0145378 | A1 | 5/2018 | Fujita | |
| 2020/0161875 | A1* | 5/2020 | Nishikawa | H02J 3/32 |
| 2023/0198271 | A1* | 6/2023 | Gong | H01M 10/425 |
| | | | | 320/117 |
| 2023/0261485 | A1* | 8/2023 | Xiao | H02J 7/00306 |
| | | | | 320/116 |

OTHER PUBLICATIONS

The EPC Office Action dated Apr. 15, 2024 for the related European Patent Application No. 21830062.2.

\* cited by examiner

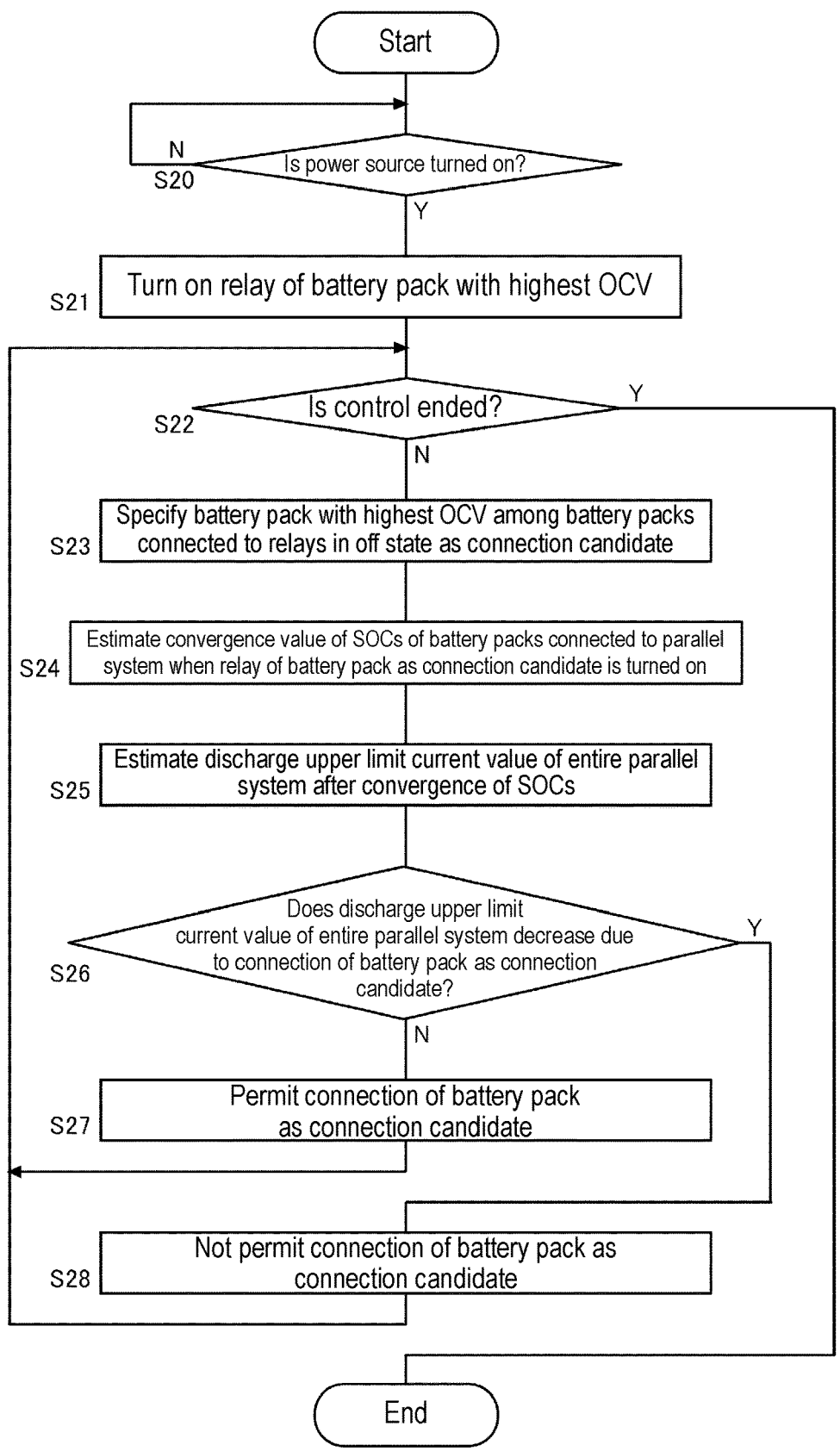

MANAGEMENT DEVICE AND POWER SUPPLY SYSTEM

CROSS-REFERENCE TO RELATED APPLICATIONS

This application is a U.S. national stage application of the PCT International Application No. PCT/JP2021/022957 filed on Jun. 16, 2021, which claims the benefit of foreign priority of Japanese patent application No. 2020-110619 filed on Jun. 26, 2020, the contents all of which are incorporated herein by reference.

TECHNICAL FIELD

The present disclosure relates to a management device that manages a plurality of power storage modules connected in parallel to a load, and a power supply system.

BACKGROUND ART

In recent years, relatively low-power (for example, drive at 48 V) electric vehicles, such as an electric motorcycle, an electric golf cart, and an electric land car, have been widely used. Some of such electric vehicles use a power supply system where a plurality of detachable and replaceable battery packs is connected in parallel. When the plurality of battery packs is connected in parallel, a cross current can be generated.

There has been proposed control for preventing a current exceeding a rated current from flowing through battery packs or a relay due to a cross current when the battery packs being separated are connected in parallel (see, for example, PTL 1). In addition, there has been proposed control for estimating a transient voltage at a time of cutting the connection between batteries connected in parallel, and turning off a relay when the voltage of the relay is likely to exceed a rated voltage (see, for example, PTL 2).

CITATION LIST

Patent Literature

PTL 1: Unexamined Japanese Patent Publication No. 2009-33936
PTL 2: WO 2012/164630 A

SUMMARY OF THE INVENTION

When battery packs being separated are connected in parallel, an upper limit value of current or power allowed to be supplied entirely from a parallel system to a load usually increases. However, due to the cross current generated by the parallel connection, the upper limit value of the current or power allowed to be supplied entirely from the parallel system to the load may decreases to be lower than that before the parallel connection. This decrease in the upper limit value may cause adverse effects such as a degradation in acceleration performance of an electric vehicle.

The present disclosure has been made in view of such circumstances, and an object thereof is to provide a technique that prevents a shortage of a current to be supplied from the parallel system to the load.

In order to solve the above problem, a management device from an aspect of the present disclosure that manages a plurality of power storage modules connected in parallel to a load via switches, includes a determination unit, some of the switches connected to some of the plurality of power storage modules being in an on state, the other switches connected to the other power storage modules being in an off state, the determination unit not permitting at least one of the other switches in the off state to be turned on when the at least one switch is turned on and an upper limit value of current or power allowed to be supplied to the load entirely from the plurality of power storage modules with the at least one switch being turned on is lower than or equal to a value before the turning-on of the at least one switch.

According to the present disclosure, it is possible to prevent a shortage of a current to be supplied from a parallel system to a load.

BRIEF DESCRIPTION OF THE DRAWINGS

FIG. 9 is a flowchart illustrating processing for determining parallel connection according to an example 2.

DESCRIPTION OF EMBODIMENT

Figure 1:
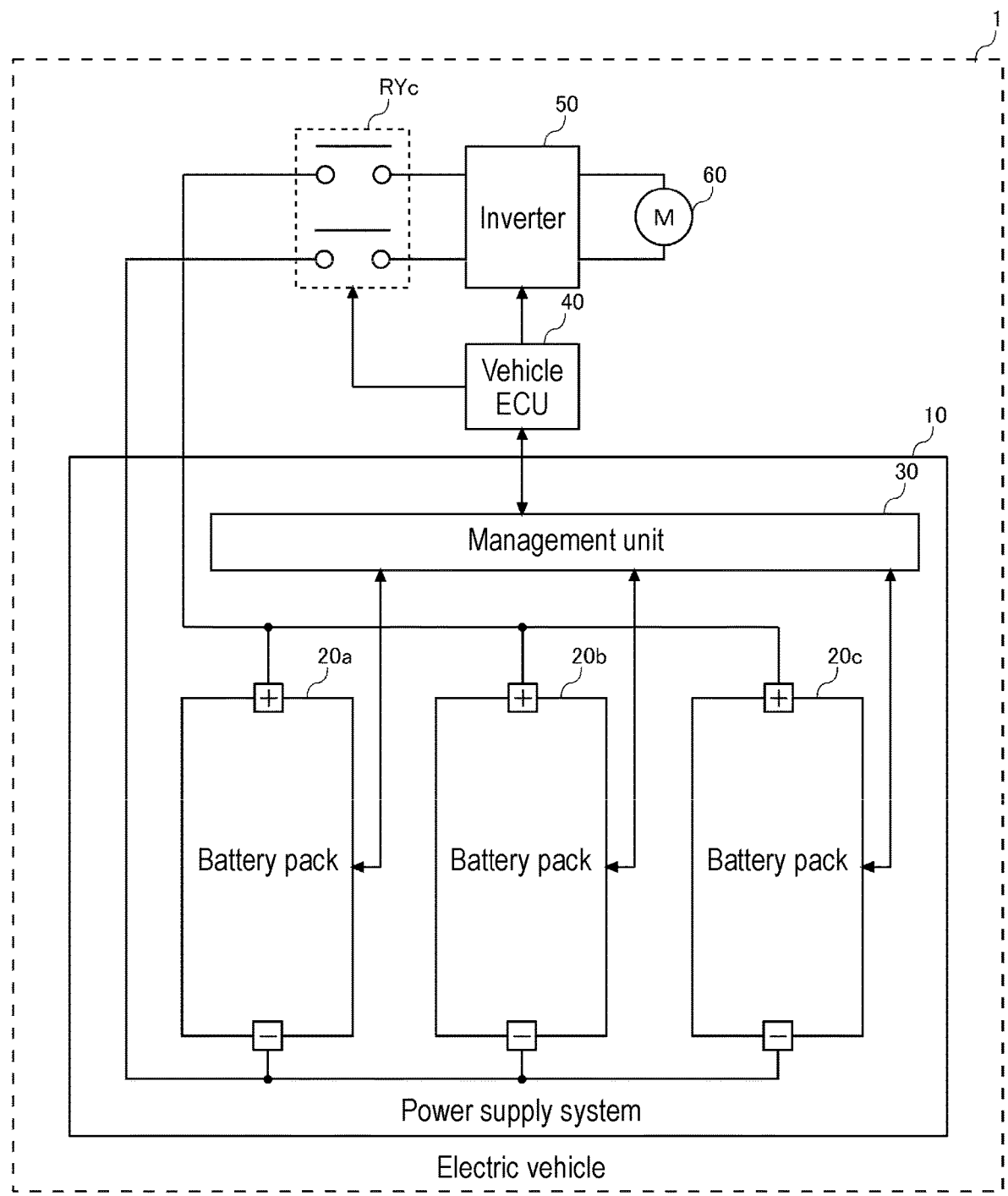
FIG. 1 is a view illustrating an electric vehicle equipped with a power supply system according to an exemplary embodiment.

FIG. 1 is a view illustrating electric vehicle 1 equipped with power supply system 10 according to an exemplary embodiment of the present disclosure. Electric vehicle 1 is an electric vehicle using replaceable battery pack 20 as a power source, and corresponds to, for example, an electric motorcycle, an electric golf cart, or an electric land car. Battery pack 20 is a portable and replaceable battery pack that is detachable, and can be mounted in a mounting slot of electric vehicle 1 by a user.

Power supply system 10 is connected to motor 60 via main relay RYc and inverter 50. At the time of power running, inverter 50 converts DC power supplied from power supply system 10 into AC power and supplies the AC power to motor 60. At the time of regeneration, inverter 50 converts AC power supplied from motor 60 into DC power and supplies the DC power to power supply system 10. Motor 60 is a three-phase AC motor, and rotates in accordance with the AC power supplied from inverter 50 at the time of power running. At the time of regeneration, the motor converts rotational energy by deceleration into AC power and supplies the AC power to inverter 50.

Vehicle electronic control unit (ECU) 40 is a control device that entirely controls electric vehicle 1. Main relay RYc is a contactor inserted between wiring connecting power supply system 10 and inverter 50. At the time of running of electric vehicle 1, vehicle ECU 40 controls main relay RYc to an on state (closed state) and electrically connects power supply system 10 with a power system of electric vehicle 1. During non-running of electric vehicle 1, vehicle ECU 40 controls main relay RYc into an off-state (close state), and disconnects the electrical connection between power supply system 10 and the power system of electric vehicle 1. Instead of the relay, another type of switch such as a semiconductor switch may be used.

Power supply system 10 includes a plurality of battery packs 20a to 20c and management unit 30. The plurality of battery packs 20a to 20c is connected in parallel to a load (mainly motor 60) of electric vehicle 1. The number of battery packs 20 connected in parallel is determined in accordance with a required capacity or required output of electric vehicle 1. FIG. 1 illustrates an example where three battery packs 20a to 20c are connected in parallel. However, the present disclosure is not limited to the case where three battery packs are connected in parallel. The larger number of battery packs 20 may be connected in parallel so as to extend a millage. Further, in the case of small electric vehicle 1, two battery packs may be connected in parallel.

Figure 2:
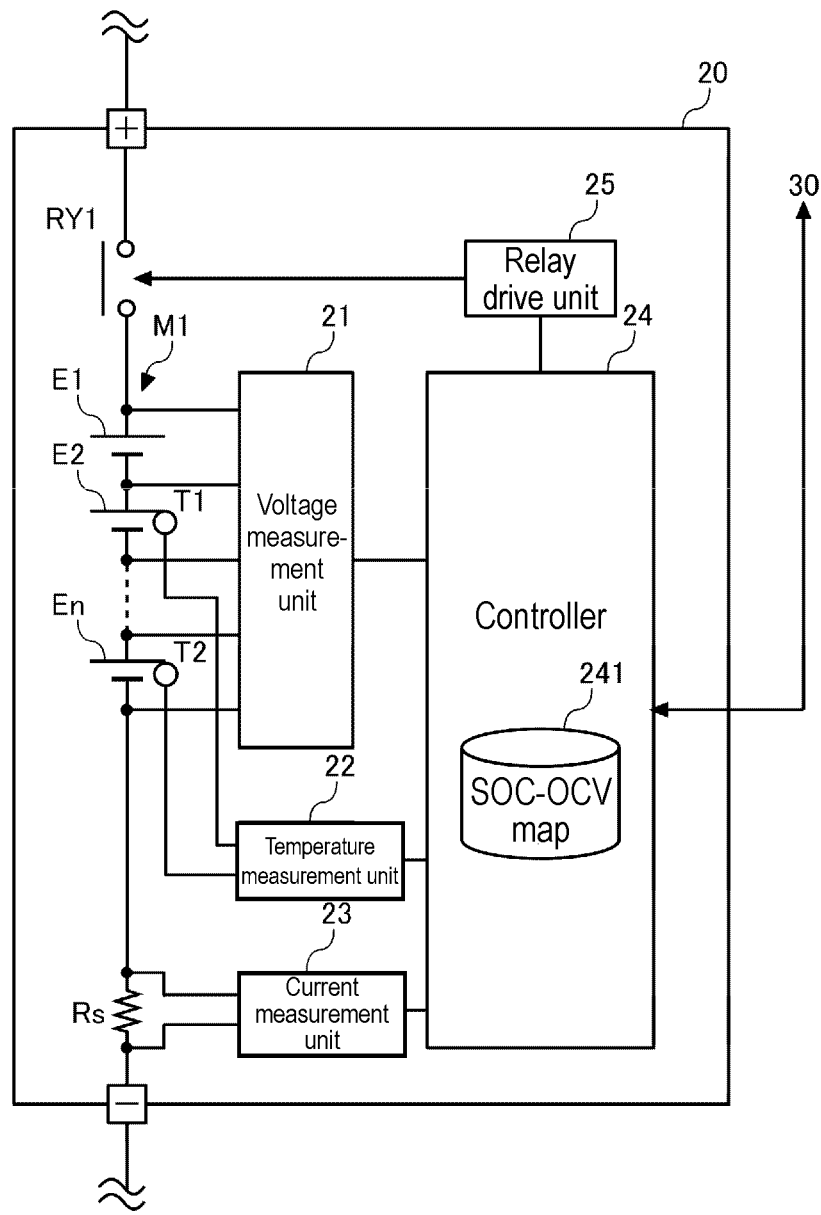
FIG. 2 is a view illustrating an example of an internal configuration of a battery pack in FIG. 1.

FIG. 2 is a view illustrating an example of an internal configuration of battery pack 20 in FIG. 1. Battery pack 20 includes pack relay RY1, relay drive unit 25, battery module M1, shunt resistor Rs, temperature sensors T1, T2, voltage measurement unit 21, temperature measurement unit 22, current measurement unit 23, and controller 24. Relay drive unit 25 turns on or off pack relay RY1 in accordance with a control signal received from management unit 30 via controller 24.

Battery module M1 includes a plurality of cells E1 to En connected in series. Battery module M1 may be configured by connecting, in series, a plurality of cell blocks including a plurality of cells connected in parallel. As the cell, a lithium ion battery cell, a nickel metal hydride battery cell, a lead battery cell, or the like can be used. Hereinafter, the present description assumes an example of use of lithium ion battery cells (nominal voltage: 3.6 V to 3.7 V).

Shunt resistor Rs is connected in series with the plurality of cells E1 to En configuring battery module M1. Shunt resistor Rs functions as a current detection element. A Hall element may be used in place of shunt resistor Rs. The plurality of temperature sensors T1, T2 that detects temperatures of the plurality of cells E1 to En is disposed. One temperature sensor may be disposed in battery module M1, or a plurality of temperature sensors may be disposed in battery module M1. For example, a thermistor can be used for temperature sensors T1, T2.

A plurality of voltage lines is connected between nodes of the plurality of cells E1 to En connected in series and voltage measurement unit 21. Voltage measurement unit 21 measures voltage of each of cells E1 to En by measuring a voltage between two adjacent voltage lines. Voltage measurement unit 21 transmits the measured voltages of cells E1 to En to controller 24 via a communication line.

Since voltage measurement unit 21 has a higher voltage than controller 24, voltage measurement unit 21 and controller 24 are connected by the communication line with them being in an insulated state as necessary. Voltage measurement unit 21 can be configured using an application specific integrated circuit (ASIC) or a general-purpose analog front-end IC. Voltage measurement unit 21 includes a multiplexer and an analog-digital(A/D) converter. The multiplexer outputs the voltage between the two adjacent voltage lines to the A/D converter in order from the top. The A/D converter converts, into a digital value, an analog voltage to receive from the multiplexer.

Temperature measurement unit 22 includes a voltage dividing resistor and an A/D converter. The A/D converter sequentially converts a plurality of analog voltages divided by the plurality of temperature sensors T1, T2 and the plurality of voltage dividing resistors into digital values, and outputs the digital values to controller 24. Controller 24 estimates the temperatures of the plurality of cells E1 to En based on the digital values.

Current measurement unit 23 includes a differential amplifier and an A/D converter. The differential amplifier amplifies a voltage across shunt resistor Rs and outputs the amplified voltage to the A/D converter. The A/D converter converts the analog voltage receive from the differential amplifier into a digital value, and outputs the digital value to controller 24. Controller 24 estimates a current flowing through the plurality of cells E1 to En based on the digital value.

When the A/D converter is mounted in controller 24 while an analog input port is installed in controller 24, temperature measurement unit 22 and current measurement unit 23 may output an analog voltage to controller 24, and the A/D converter in controller 24 may convert the analog voltage into a digital value.

Controller 24 manages the states of the plurality of cells E1 to En based on the voltages, the temperatures, and the currents of the plurality of cells E1 to En measured by voltage measurement unit 21, temperature measurement unit 22, and current measurement unit 23. Controller 24 can be configured by a microcomputer and a nonvolatile memory (for example, an electrically erasable programmable read-only memory (EEPROM) or a flash memory).

In the nonvolatile memory or a memory of the microcomputer, state of charge (SOC)-open circuit voltage (OCV) map 241 is held. SOC-OCV map 241 describes characteristic data of SOC-OCV curves of cells E1 to En. The SOC-OCV curves of cells E1 to En are created in advance based on a characteristic test by a battery manufacturer and are registered in the nonvolatile memory or the memory of the microcomputer at the time of shipment. The SOC-OCV characteristics of the cells E1 to En may depend on the temperature and the degree of degradation (state of health (SOH)). In this case, the battery manufacturer derives and maps the SOC-OCV characteristics of cells E1-En for each combination of a temperature category and a degree-of-degradation category. Instead of the map, a function using the SOC as an objective variable, the OCV, the temperature, and the degree of degradation as explanatory variables may be used.

Controller 24 can estimate the SOC and the SOH of each of the plurality of cells E1 to En. Controller 24 can estimate the SOC using an OCV method or a current integration method. The OCV method is used to estimate the SOC based on the OCV calculated from the voltage of each of cells E1 to En measured by voltage measurement unit 21, a current of battery module M1 measured by current measurement unit 23, and a temperature of battery module M1 measured by temperature measurement unit 22, and based on characteristic data of the SOC-OCV curves described in SOC-OCV map 241. The current integration method is used to estimate the SOC based on the OCV at the start of charging and discharging of each of cells E1 to En and an integrated value of the currents measured by controller 24. In the current integration method, a measurement error of current measurement unit 23 accumulates as the charging and discharging time becomes longer. Thus, the SOC estimated with the current integration method is preferably corrected using the SOC estimated with the OCV method.

The SOH is defined as a ratio of current full charge capacity to initial full charge capacity, and a lower value (closer to 0%) indicates that degradation has progressed more. The SOH may be obtained by measuring the capacity through full charging and discharging, or may be obtained by adding storage degradation and cycle degradation. The storage degradation can be estimated based on the SOC, the temperature, and a storage degradation speed. The cycle degradation can be estimated based on a SOC range to be used, the temperature, a current rate, and the cycle degradation speed. The storage degradation speed and the cycle degradation speed can be derived preliminarily by an experiment or simulation. The SOC, the temperature, the SOC range, and the current rate can be obtained by measurement.

The SOH can also be estimated based on a correlation between the SOH and an internal resistance of the cell. The internal resistance can be estimated by dividing, by the current value, a voltage drop occurring when a predetermined current flows through the cell for a predetermined time. The internal resistance decreases as the temperature rises, and increases as the SOH decreases.

Controller 24 periodically transmits monitoring data including at least one of the voltage, the temperature, the current, the SOC, the SOH, and the internal resistance of each of the plurality of cells E1 to En included in battery pack 20 to management unit 30. Communication between controller 24 of battery pack 20 and management unit 30 may be, for example, serial communication conforming to RS-485 specifications. Controller 24 of battery pack 20 and management unit 30 may be connected to each other through a dedicated communication line, wireless communication, or power line communication.

Figure 3:
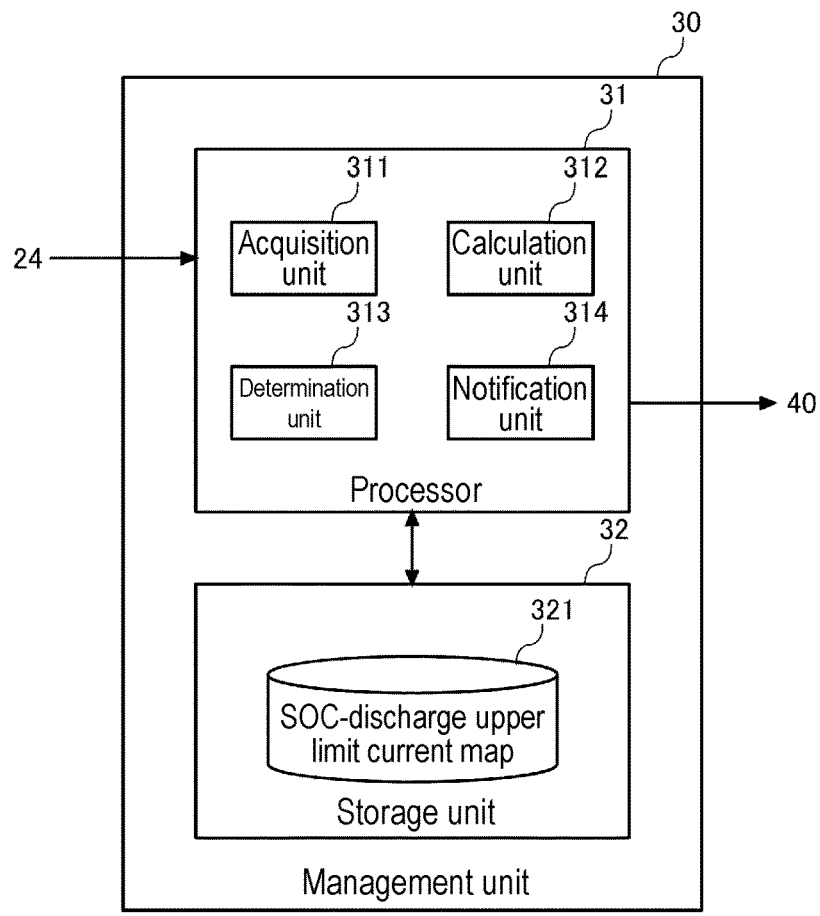
FIG. 3 is a view illustrating an example of an internal configuration of a management unit in FIG. 1.

FIG. 3 is a view illustrating an example of an internal configuration of management unit 30 in FIG. 1. Management unit 30 includes processor 31 and storage unit 32, and manages the plurality of battery packs 20a to 20c.

Processor 31 includes acquisition unit 311, calculation unit 312, determination unit 313, and notification unit 314. A function of processor 31 can be achieved by cooperation of a hardware resource and a software resource, or by the hardware resource alone. A central processing unit (CPU), a read only memory (ROM), a random access memory (RAM), a digital signal processor (DSP), an application specific integrated circuit (ASIC), a field-programmable grid array (FPGA), and other large scale integrated circuits (LSIs) can be used as the hardware resources. The software resource may be a program such as firmware.

Storage unit 32 includes a nonvolatile recording medium such as a flash memory. Storage unit 32 holds SOC-discharge upper limit current map 321. SOC-discharge upper limit current map 321 describes characteristic data of SOC-discharge upper limit current curves of cells E1 to En. The SOC-discharge upper limit current curves of cells E1 to En are created based on a characteristic test by a battery manufacturer. The SOC-discharge upper limit current curves are characteristic data in which the upper limit value of the discharge current which is allowed to be discharged from a cell is defined for each SOC from the viewpoint of cell protection and safety. In a general cell, the lower the SOC is, the lower the upper limit value of the current allowed to be discharged is.

At the time of discharging from a cell, a closed circuit voltage (CCV) decreases as the discharge current increases. The CCV of the cell at the time of discharging is defined by the following (Equation 1). The CCV of the cell at the time of charging is defined by the following (Equation 2).

$$CCVd = OCV - Id \times R \quad \text{(Equation 1)}$$

$$CCVc = OCV + Ic \times R \quad \text{(Equation 2)}$$

In the equations, Id indicates a discharge current, Ic indicates a charge current, and R indicates an internal resistance.

As expressed in the above (Equation 1), when the discharge current Id increases, the CCV decreases. When the CCV enters an overdischarge region, a load on the battery increases, which causes degradation. As expressed in the above (Equation 1), the lower the OCV, the lower the CCV. Since the OCV decreases as the SOC decreases, the upper limit value of the discharge current Id has to be defined to be lower as the SOC decreases.

SOC-discharge upper limit current characteristics of cells E1 to En depend on the temperature and the degree of degradation (SOH). The battery manufacturer derives and maps the SOC-discharge upper limit current characteristics of cells E1-En for each combination of a temperature category and a degree-of-degradation category. The SOC-discharge upper limit current characteristics may be registered in storage unit 32 of management unit 30 at the time of shipment, or may be registered in controller 24 of battery pack 20 and acquired from battery pack 20 when battery pack 20 is first mounted to electric vehicle 1. Instead of the SOC-discharge upper limit current characteristics, SOC-discharge upper limit power characteristics may be used. The map may be replaced by a function using the discharge upper limit current or the discharge upper limit power as an objective variable, and the SOC, the temperature, and the degree of degradation as explanatory variables.

Figure 4:
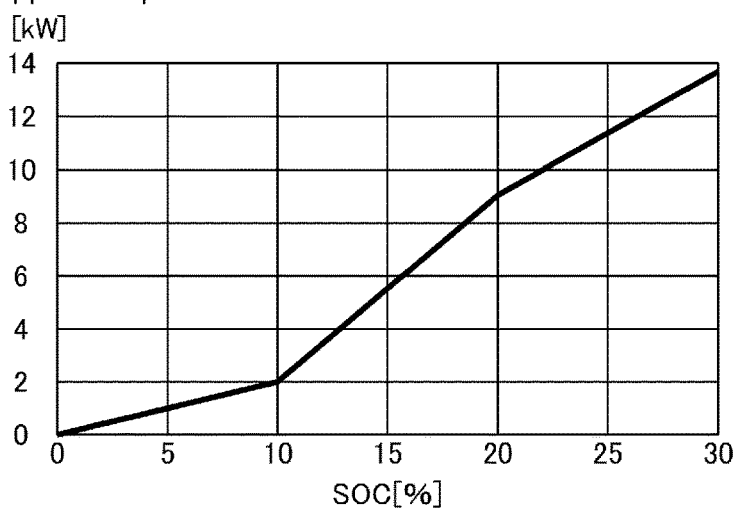
FIG. 4 is a graph illustrating an example of a state of charge (SOC)-discharge upper limit power characteristic at 0° C. of a certain battery pack.

FIG. 4 is a graph illustrating an example of the SOC-discharge upper limit power characteristic at 0° C. of a certain battery pack. As illustrated in FIG. 4, the lower the SOC, the lower the discharge upper limit power.

The description returns to FIG. 3. Acquisition unit 311 acquires monitoring data including at least the voltages and the SOCs of cells E to En from controller 24 of each battery pack 20. Calculation unit 312 estimates the voltage of battery module M1 in battery pack 20 by adding the voltages of the plurality of cells E-En for each battery pack 20. Normally, the lowest cell SOC is set as the pack SOC when the SOC is low, and the highest cell SOC is set as the pack SOC when the SOC is high.

As described above, in the present exemplary embodiment, pack relays RY1 connected to some of the plurality of battery packs 20a to 20c are turned on, and pack relays RY1 connected to remaining battery packs 20 are turned off. When one of pack relays RY1 in the off state (hereinafter, referred to as target pack relay RY1) is has to be turned on, calculation unit 312 estimates an upper limit value of current or power allowed to be supplied to the load of electric vehicle 1 entirely from the plurality of battery packs 20 (hereinafter, referred to as a parallel system) with target pack relay RY1 being turned on.

Determination unit 313 compares the upper limit value (hereinafter, referred to as a predicted upper limit value) estimated by calculation unit 312 with an upper limit value (hereinafter, referred to as a current upper limit value) of the current or power allowed to be supplied from the parallel system to the load of electric vehicle 1 before turning-on of target pack relay RY1. Determination unit 313 permits target pack relay RY1 to be turned on when the predicted upper limit value is greater than or equal to the current upper limit value, and does not permit target pack relay RY1 to be turned on when the predicted upper limit value is lower than the current upper limit value. When determination unit 313 permits target pack relay RY1 to be turned on, relay drive unit 25 turns on target pack relay RY1.

Notification unit 314 notifies vehicle electronic control unit (ECU) 40 of the upper limit value (hereinafter, referred to as a discharge upper limit current value or a discharge upper limit power value of the entire parallel system) of the current or power allowed to be discharged from the parallel system. Management unit 30 and vehicle ECU 40 are connected by an in-vehicle network. For example, a controller area network (CAN) or a local interconnect network (LIN) can be used as the in-vehicle network. Vehicle ECU 40 sets, in inverter 50, the discharge upper limit current value or the discharge upper limit power value of the entire parallel system received from management unit 30. Inverter 50 controls the output current or output power to be supplied to motor 60 within a range of the set discharge upper limit current value or discharge upper limit power value.

Basically, as the number of battery packs 20 connected in parallel to the load of electric vehicle 1 increases, the discharge upper limit current value or the discharge upper limit power value of the entire parallel system increases. However, even when battery pack 20 is added to the parallel system, the discharge upper limit current value or the discharge upper limit power value of the entire parallel system may not increase. This is the case where a cross current is generated between the plurality of battery packs 20 due to the connection of unconnected battery pack 20.

Figure 5:
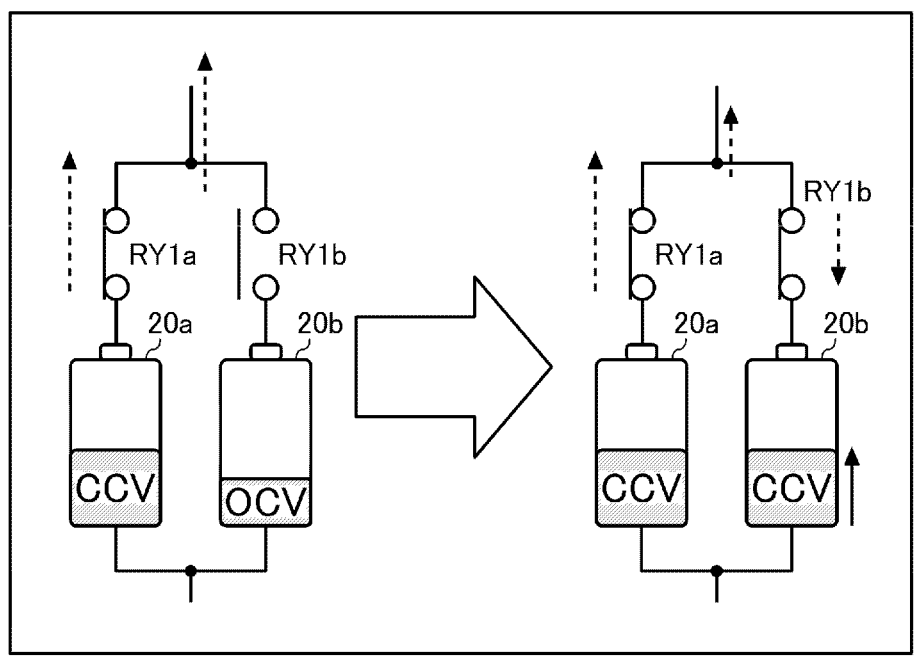
FIG. 5 is a view illustrating a cross current between battery packs.

FIG. 5 is a view illustrating a cross current between battery packs 20. FIG. 5 illustrates parallel connection of two battery packs 20 for easy understanding of the description. A state on a left side is a state where first pack relay RY1 connected to first battery pack 20a is turned on, second pack relay RY1 connected to second battery pack 20b is turned off, and the current is supplied to the load only from first battery pack 20a. In this case, the discharge upper limit current value of the entire parallel system matches the discharge upper limit current value of first battery pack 20a.

A state on a right side of FIG. 5 is a view illustrating a state after turning-on of second pack relay RY1. When the OCV of second battery pack 20b is lower than the CCV in the case of discharging from first battery pack 20a at the discharge upper limit current value, a cross current is generated from first battery pack 20a to second battery pack 20b. As a result, the current discharged from first battery pack 20a is branched into the load and second battery pack 20b, and the discharge upper limit current value of the entire parallel system decreases. When motor 60 of electric vehicle 1 rotates around the discharge upper limit current value, unintended deceleration may occur due to the decrease in the discharge upper limit current value.

The CCV in a case of discharging from first battery pack 20a at the discharge upper limit current value is an estimated value. The current discharged from first battery pack 20a fluctuates due to a load fluctuation, and the CCV of first battery pack 20a also fluctuates due to the load fluctuation. The CCV in the case of discharging from first battery pack 20a at the discharge upper limit current value is a value indicating the minimum voltage at the time of discharging from first battery pack 20a.

Next, a case where second pack relay RY1 is turned on when the CCV in the case of discharging from first battery pack 20a at the discharge upper limit current value matches the OCV of second battery pack 20b will be considered. When the current actually discharged from first battery pack 20a to the load matches the discharge upper limit current value of first battery pack 20a, the voltage of first battery pack 20a is equal to the voltage of second battery pack 20b. In this case, no cross current is generated between first battery pack 20a and second battery pack 20b, and the discharge upper limit current value of the entire parallel system does not decrease.

When the current actually discharged from first battery pack 20a to the load is lower than the discharge upper limit current value of first battery pack 20a, a cross current is likely to be generated between first battery pack 20a and second battery pack 20b. However, the cross current stops when a consumption current of the load increases to the discharge upper limit current value of first battery pack 20a, and thus the discharge upper limit current value of the entire parallel system does not decrease.

Next, a case where second pack relay RY1 is turned on when the OCV of second battery pack 20b is higher than the CCV in the case of discharging from first battery pack 20a at the discharge upper limit current value will be considered. Since the discharge upper limit current value of second battery pack 20b is greater than the discharge upper limit current value of first battery pack 20a, the discharge upper limit current value of the entire parallel system does not decrease when second pack relay RY1 is turned on.

Note that the above description has described the example in which both the discharge upper limit current value of each battery pack 20 and the discharge upper limit current value of the entire parallel system are calculated by calculation unit 312 of management unit 30. In this regard, the discharge upper limit current value of battery pack 20 may be calculated by controller 24 in battery pack 20. Controller 24 in each battery pack 20 transmits the calculated discharge upper limit current value of battery pack 20 to management unit 30. Calculation unit 312 of management unit 30 calculates the discharge upper limit current value of the entire parallel system based on the discharge upper limit current values received from the plurality of battery packs 20.

Hereinafter, two examples of processing for determining whether to permit parallel connection of target pack relay RY1 will be described. An example 1 is dynamic determination processing, and an example 2 is static determination processing.

Figure 6:
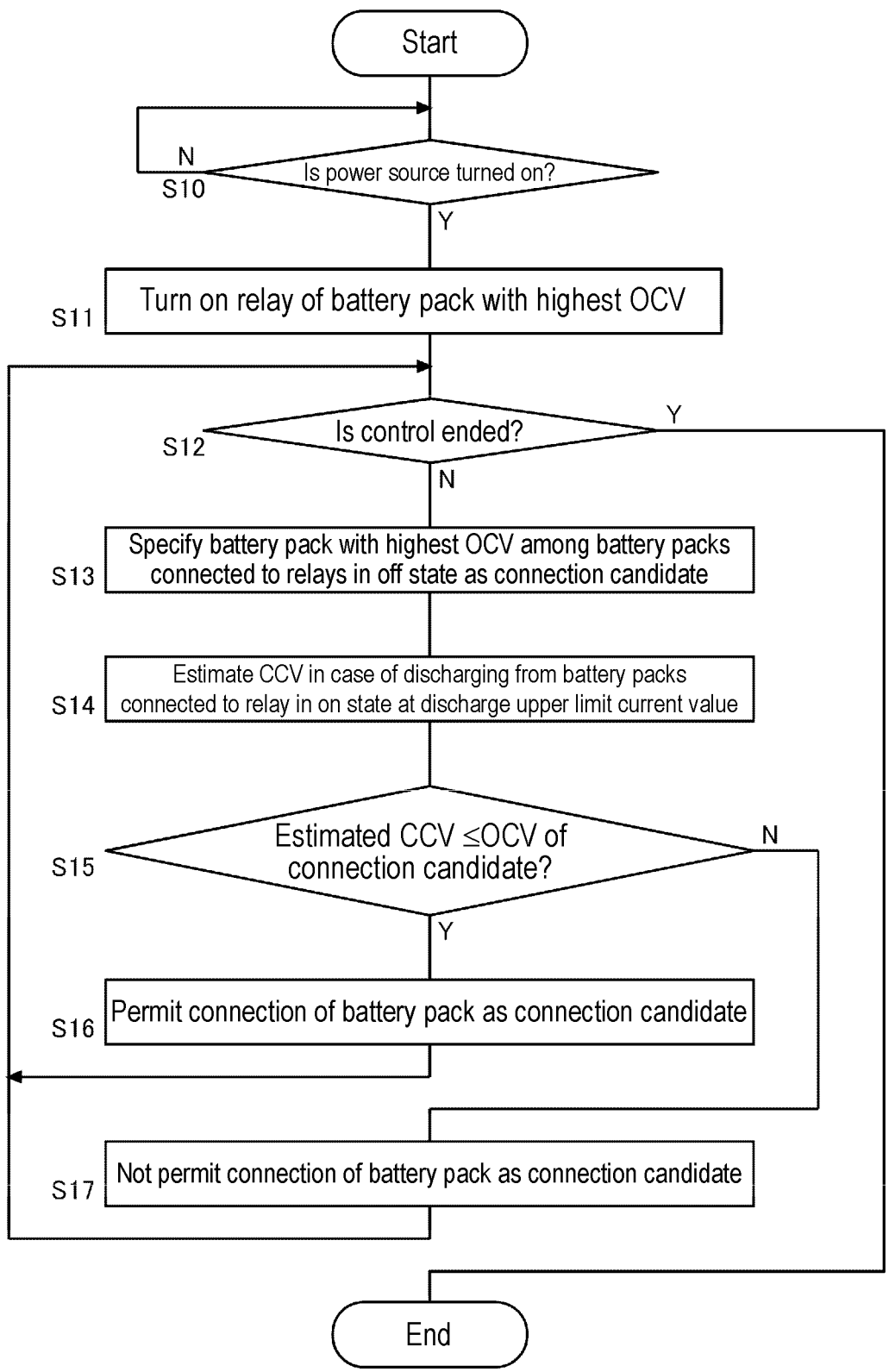
FIG. 6 is a flowchart illustrating processing for determining parallel connection according to an example 1.

FIG. 6 is a flowchart for describing the processing for determining parallel connection according to the example 1. If the power supply of electric vehicle 1 is turned on (corresponding to ignition on of an engine vehicle) (Y in S10), determination unit 313 causes relay drive unit 25 to turn on pack relay RY1 connected to battery pack 20 with the highest OCV among the plurality of battery packs 20 (S11). If a plurality of battery packs 20 has the highest OCV, determination unit 313 simultaneously turns on the plurality of pack relays RY1 connected to the plurality of battery packs 20.

While the parallel connection control is being executed (N in S12), the following processing is executed. Determination unit 313 specifies battery pack 20 with the highest OCV among battery packs 20 connected to pack relays RY1 in the off state as a connection candidate where pack relay RY1 has to be next turned on (S13).

Based on the SOC of battery pack 20 connected to pack relay RY1 in the on state, calculation unit 312 refers to SOC-discharge upper limit current map 321 to derive the discharge upper limit current value of battery pack 20. Calculation unit 312 applies the OCV, the internal resistance, and the discharge upper limit current value of battery pack 20 to the above (Equation 1) to estimate the CCV corresponding to the discharge upper limit current value of battery pack 20 (S14). In deriving the SOC, the internal resistance, and the discharge upper limit current value of battery pack 20, calculation unit 312 uses the temperature and the SOH of battery pack 20 as parameters.

Determination unit 313 compares the estimated CCV with the OCV of battery pack 20 that is a connection candidate (S15). If the estimated CCV is less than or equal to the OCV of battery pack 20 as the connection candidate (Y in S15), determination unit 313 permits the connection of battery pack 20 as the connection candidate (S16), and causes relay drive unit 25 to turns on pack relay RY1 connected to battery pack 20 as the connection candidate. If the estimated CCV is higher than the OCV of battery pack 20 as the connection candidate (N in S15), determination unit 313 does not permit the connection of battery pack 20 as the connection candidate (S17). The processing goes to step S12.

If pack relay RY1 is in the on state in the plurality of battery packs 20, the CCVs corresponding to the discharge upper limit current values of the plurality of battery packs 20 are identical to each other. In a state where the CCVs are identical to each other, calculation unit 312 estimates the CCVs corresponding to the discharge upper limit current values of the plurality of battery packs 20 in the on state.

If the estimated CCVs are higher than the OCV of battery pack 20 as the connection candidate in the determination in step S15, battery pack 20 as the connection candidate cannot be connected. However, when the state where the currents are supplied from battery packs 20 in the on state to the load continues, the SOCs of battery packs 20 in the on state decrease. As the SOCs decrease, the OCV decreases, and the CCVs corresponding to the discharge upper limit current values also decrease. When the CCVs corresponding to the discharge upper limit current values decrease to the OCV of battery pack 20 as the connection candidate, battery pack 20 as the connection candidate can be connected. Note that the CCVs corresponding to the discharge upper limit current values may decrease due to a temperature change.

Next, the processing for determining parallel connection of the example 2 will be described. As described above, when the SOCs among the plurality of battery packs 20 connected in parallel are not uniform, a cross current is generated from battery pack 20 with a high SOC to battery pack 20 with a low SOC. Due to the cross current, the SOC of battery pack 20 with a high SOC decreases, and the SOC of battery pack 20 with a low SOC increases. When the voltage does not differ therebetween, the cross current stops. In the state where the cross current stops, the SOCs and the OCVs between the plurality of battery packs 20 connected in parallel are uniform.

Figure 7:
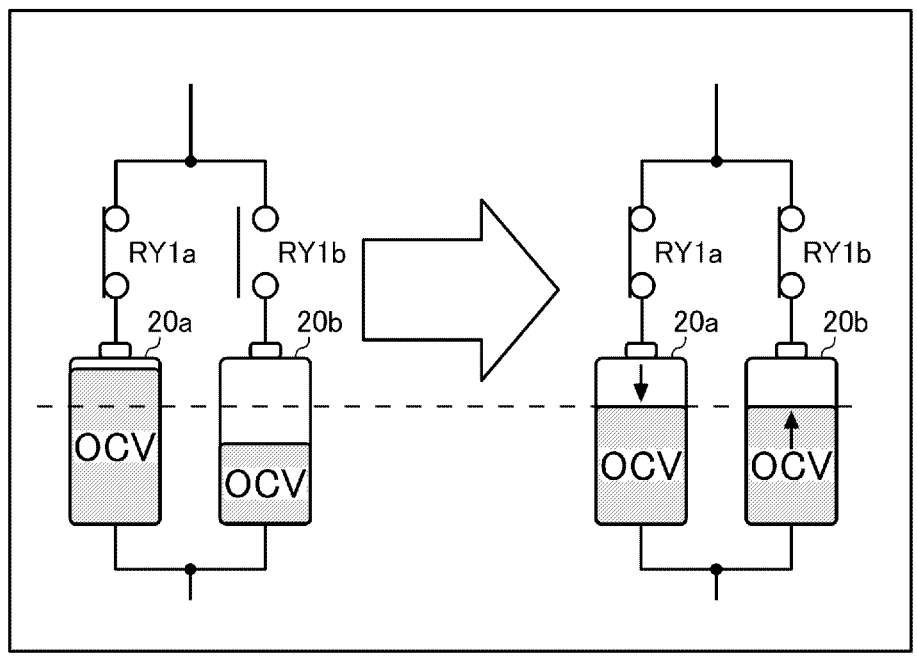
FIG. 7 is a view illustrating the cross current between the battery packs and convergence of an open circuit voltage (OCV).

FIG. 7 is a view illustrating the cross current among battery packs 20 and convergence of the OCVs. FIG. 7 illustrates the parallel connection of two battery packs 20 for easy understanding of the description. A state on a left side is a state where first pack relay RY1 connected to first battery pack 20*a* is turned on, second pack relay RY1 connected to second battery pack 20*b* is turned off, and the OCV of first battery pack 20*a* is higher than the OCV of second battery pack 20*b*.

A state on a right side in FIG. 7 illustrates a state after turning-on of second pack relay RY1. When first battery pack 20*a* and second battery pack 20*b* are conducted, a current flows from first battery pack 20*a* to second battery pack 20*b*, the OCV of first battery pack 20*a* decreases, and the OCV of second battery pack 20*b* increases. Eventually, when both the OCVs are uniform, the cross current from first battery pack 20*a* to second battery pack 20*b* stops.

The OCV of each of first battery pack 20*a* and second battery pack 20*b* in the state where the cross current stops becomes an average SOC of an average value of the SOC of first battery pack 20*a* and the SOC of second battery pack 20*b* before generation of the cross current, and becomes the OCV according to the average SOC when conditions such as the pack capacity are satisfied. Also when three or more battery packs 20 having non-uniform OCVs are connected in parallel, the OCVs of three or more battery packs 20 to be estimated are made to be uniform by the cross current. The OCVs of three or more battery packs 20 after the OCVs are uniform become an average value of the OCVs of three or more battery packs 20 before the generation of the cross current.

In the example 2, calculation unit 312 estimates the discharge upper limit current value of the entire parallel system at the time of convergence of the OCVs after connection of unconnected battery pack 20 to the parallel system. When the estimated discharge upper limit current value is greater than or equal to the discharge upper limit current value of the entire parallel system before connection of unconnected battery pack 20 to the parallel system, determination unit 313 permits the connection of unconnected battery pack 20. When the estimated discharge upper limit current value is less than the discharge upper limit current value of the entire parallel system before connection, determination unit 313 does not permit the connection of unconnected battery pack 20.

Figure 8:
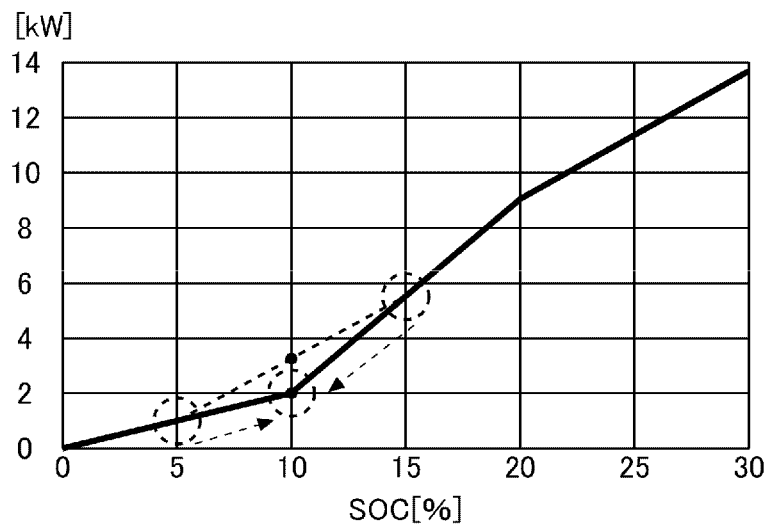
FIG. 8 is a graph illustrating an example of a change in a discharge upper limit power value of an entire parallel system before and after connection of an unconnected battery pack.

FIG. 8 is a graph illustrating an example of a change in a discharge upper limit power value of the entire parallel system before and after connection of unconnected battery pack 20. For example, a state where first battery pack 20*a* is connected to the load and second battery pack 20*b* is not connected to the load as in the state on the left side in FIG. 7 will be considered. Hereinafter, a battery pack using the same type of cells is assumed, and the SOC of first battery pack 20*a* is 15% and the SOC of second battery pack 20*b* is 5% under the same conditions regarding the pack capacity, the SOH, and the temperature. Referring to the SOC-discharge upper limit power characteristic illustrated in FIG. 8, the discharge upper limit power value is 5.8 kW when the SOC is 15%. Similarly, the discharge upper limit power value of the entire parallel system to which only first battery pack 20*a* is connected is 5.8 kW.

Next, a state after connection of second battery pack 20*b* to the parallel system as in the state on the right side in FIG. 7 will be considered. When second battery pack 20*b* is connected to the parallel system, a cross current is generated from first battery pack 20*a* to second battery pack 20*b*. Due to the cross current, the SOC of first battery pack 20*a* decreases, and the SOC of second battery pack 20*b* increases. When both the SOCs reach 15%, the cross current stops. Referring to the SOC-discharge upper limit power characteristic illustrated in FIG. 8, the discharge upper limit power value is 2.0 kW when the SOC is 10%. Therefore, the discharge upper limit power value of the entire parallel system in a state where first battery pack 20*a* and second battery pack 20*b* are connected is 4.0 kW (=2.0 kW×2).

In this example, when second battery pack 20*b* is connected, the discharge upper limit power value of the entire parallel system decreases from 5.8 kW to 4.0 kW. As illustrated in FIG. 8, when a discharge upper limit power value in a state where the SOCs are uniform (SOC=10%) is present below an imaginary line obtained by connecting the discharge upper limit power value (5.8 kW) of first battery pack 20*a* and the discharge upper limit power value (1.0 kW) of second battery pack 20*b* before connection of second battery pack 20*b*, the discharge upper limit power value of the entire parallel system may decrease. When the discharge upper limit power value in the state where the SOCs are uniform (SOC=10%) is present above the imaginary line, the upper limit power value of the entire parallel system increases.

FIG. 9 is a flowchart for describing the processing for determining parallel connection according to the example 2. If the power source of electric vehicle 1 is turned on (Y in S20), determination unit 313 causes relay drive unit 25 to turn on pack relay RY1 connected to battery pack 20 with the highest OCV among the plurality of battery packs 20 (S21). If a plurality of battery packs 20 has the highest OCV, determination unit 313 simultaneously turns on the plurality of pack relays RY1 connected to the plurality of battery packs 20.

When battery pack 20 where pack relay RY1 is in the off state is present while the parallel connection control is being executed (N in S22), the following processing is executed. Determination unit 313 specifies battery pack 20 with the highest OCV among battery packs 20 connected to pack relays RY1 in the off state as a connection candidate where pack relay RY1 is next turned on (S23).

Calculation unit 312 estimates a convergence value of the SOCs of the plurality of battery packs 20 connected to the parallel system when battery pack 20 as the connection candidate is turned on (S24). Calculation unit 312 refers to SOC-discharge upper limit current map 321 to derive the discharge upper limit current value of one battery pack 20 based on the converged SOC. Calculation unit 312 multiplies the discharge upper limit current value of one battery pack 20 by the parallel number to estimate the discharge upper limit current value of the entire parallel system (S25). Note that in deriving the SOC and the discharge upper limit current value of battery pack 20, calculation unit 312 uses at least the temperature and the SOH of battery pack 20 as parameters.

Determination unit 313 determines whether the discharge upper limit current value of the entire parallel system decreases due to the connection of battery pack 20 as the connection candidate (S26). If the discharge upper limit current value of the entire parallel system does not decrease (N in S26), determination unit 313 permits the connection of battery pack 20 as the connection candidate (S27), and causes relay drive unit 25 to turn on pack relay RY1 connected to battery pack 20 as the connection candidate. If the discharge upper limit current value of the entire parallel system decreases (Y in S26), determination unit 313 does not permit the connection of battery pack 20 as the connection candidate (S28). The processing goes to step S22.

In the determination in step S26, if the discharge upper limit current value of the entire parallel system decreases due to the connection of battery pack 20 as the connection candidate, battery pack 20 as the connection candidate cannot be connected. However, when the state where the currents are supplied from battery packs 20 in the on state to the load continues, the SOCs of battery packs 20 in the on state decrease. As the SOCs decrease, the discharge upper limit current value of the entire parallel system also decreases. In any case, even where battery pack 20 as the connection candidate is connected, the discharge upper limit current value of the entire parallel system does not decrease. In addition, the discharge upper limit current value of the entire parallel system may decrease due to a temperature change.

As described above, according to the present exemplary embodiment, when the discharge upper limit current value or the discharge upper limit power value of the entire parallel system decreases due to the connection of unconnected battery pack 20, the current supplied from the parallel system to the load can be prevented from being insufficient by prohibiting the connection of unconnected battery pack 20. This can prevent occurrence of adverse effects such as degradation in acceleration performance of electric vehicle 1.

The present disclosure has been described above based on the exemplary embodiment. It is to be understood by the person of ordinary skill in the art that the exemplary embodiment is an example, that combinations of its configuration elements and processing processes can have various modified examples, and that such modified examples are also within the scope of the present disclosure.

The parallel connection determination processing of the example 1 and the parallel connection determination processing of the example 2 may be used in combination. In this case, in a case where the connection is permitted in both the determination processing, battery pack 20 as the connection candidate is connected, and in a case where the connection is not permitted in at least one determination processing, battery pack 20 as the connection candidate is not connected. For example, even when the connection of battery pack 20 as the connection candidate is permitted in the determination processing of the example 2, the connection may not be permitted in the determination processing of the example 2.

In the determination processing of the example 2, the determination is made whether battery pack 20 as the connection candidate can be connected, based on the discharge upper limit current value of the entire parallel system at a certain time in the future. The discharge upper limit current value in the process until reaching that time is not considered. On the other hand, in the determination processing of the example 1, the determination is made whether battery pack 20 as the connection candidate can be connected, based on the discharge upper limit current value at a current time that momentarily changes. Therefore, both determination results might not match in some cases. When the parallel connection determination processing of the example 1 and the parallel connection determination processing of the example 2 are used in combination, the stability of the current to be supplied from the parallel system to the load can be further improved.

The above-described exemplary embodiment has described an example in which management unit 30 is provided outside the plurality of battery packs 20. In this regard, management unit 30 may be provided inside any one of the plurality of battery packs 20. In this case, battery pack 20 that implements the function of management unit 30 serves as a master device, and remaining battery packs 20 serve as slave devices.

The above-described exemplary embodiment has described the example in which detachable and replaceable battery packs 20 are connected in parallel. In this regard, fixed battery packs 20 may be connected in parallel. When fixed battery packs 20 are used, the functions of the plurality of controllers 24 and management units 30 provided respectively in the plurality of battery packs 20 can be integrated. For example, the plurality of controllers 24 and management units 30 may be achieved by one microcomputer.

The above-described exemplary embodiment has described an example of using battery pack 20 incorporating battery module M1 including the lithium ion battery cell, the nickel metal hydride battery cell, the lead battery cell, or the like. In this regard, a capacitor pack incorporating a capacitor module including an electric double layer capacitor cell and a lithium ion capacitor cell may be used. In this description, the battery module and the capacitor module are collectively referred to as a power storage module, and the battery pack and the capacitor pack are collectively referred to as a power storage pack.

The above-described exemplary embodiment has described an example in which detachable and replaceable power storage packs are connected in parallel. In this regard, the present disclosure is also applicable to processing for determining parallel connection of a plurality of power storage modules in one power storage pack. In the above-described exemplary embodiment, an example where one power storage module is provided in one power storage pack is assumed. Thus, the processing for determining the parallel connection of the plurality of power storage packs is synonymous with the processing for determining the parallel connection of the plurality of power storage modules.

A moving body using replaceable battery pack 20 as a power source is not limited to electric vehicle 1. For example, the moving body also includes an electric ship. For example, a power source of a water bus or a water taxi may be replaceable battery pack 20. The moving body also include a train. For example, a train equipped with replaceable battery pack 20 can be used instead of a diesel train used in a non-electrified railway line. The moving body also includes an electric flying object. The electric flight object includes a multicopter (drone). The multicopter includes a so-called flying car.

The exemplary embodiment may be specified by the following items.

[Item 1]

Management device (30) that manages a plurality of power storage modules (M1) connected in parallel to load (60) via switches (RY1), includes determination unit (313), some of switches (RY1) connected to some of the plurality of power storage modules (M1) being in an on state, other switches (RY1) connected to other power storage modules (M1) being in an off state, determination unit (313) not permitting at least one of the other switches (RY1) in the off state to be turned on in a case where at least one switch (RY1) is turned on and an upper limit value of current or power allowed to be supplied to load (60) entirely from the plurality of power storage modules (M1) with at least one switch (RY1) being turned on becomes less than or equal to a value before the turning-on of at least one switch (RY1).

This makes it possible to prevent shortage of a current to be supplied to load (60) entirely from the plurality of power storage modules (M1) connected in parallel due to connection of unconnected power storage module (M1).

[Item 2]

Management device (30) of Item 1 further includes acquisition unit (311) that acquires at least states of charge (SOCs) of the plurality of power storage modules (M1), and calculation unit (313) that estimates the upper limit value of the current or power allowed to be supplied entirely from the plurality of power storage modules (M1) to load (60), based on SOC-discharge upper limit characteristics that define a relationship between the SOCs of the plurality of power storage modules (M1) and upper limit values of currents or power allowed to be discharged from the plurality of power storage modules (M1), wherein the SOC-discharge upper limit characteristics are that the upper limit values of the currents or power allowed to be discharged from the plurality of power storage modules (M1) decrease as the SOCs of the plurality of power storage modules (M1) decrease.

This makes it possible to accurately specify the upper limit value of the current or power allowed to be supplied to load (60) entirely from the plurality of power storage modules (M1).

[Item 3]

Management device (30) of Item 2, wherein acquisition unit (311) acquires an open circuit voltage (OCV) of power storage module (M1) that is a connection candidate among the other power storage modules (M1), calculation unit (313) derives the upper limit values of the currents or power allowed to be discharged from the plurality of power storage modules (M1), based on the SOC-discharge upper limit characteristics and the SOCs of the plurality of power storage modules (M1) connected to load (60), and estimates closed circuit voltages (CCVs) of the plurality of power storage modules (M1) when discharging is performed from the plurality of power storage modules (M1) at the upper limit values, and determination unit (313) does not permit switch (RY1) connected to power storage module (M1) as the connection candidate to be turned on when the OCV of power storage module (M1) as the connection candidate is lower than the estimated CCVs of the plurality of power storage modules (M1).

This makes it is possible to dynamically determine whether the current to be supplied entirely from the plurality of power storage modules (M1) to load (60) becomes insufficient.

[Item 4]

Management device (30) of Item 2 or 3, wherein calculation unit (313) estimates, based on the SOC-discharge upper limit characteristics, the SOCs of the plurality of power storage modules (M1) connected to load (60), and the SOC of power storage module (M1) as the connection candidate, an upper limit value of the current or power allowed to be supplied to load (60) entirely from the plurality of power storage modules (M1) when the SOCs of the plurality of power storage modules (M1) connected to load (60) correspond to the SOC of power storage module (M1) as the connection candidate after switch (RY1) connected to power storage module (M1) as the connection candidate is turned on, and determination unit (313) does not permit switch (RY1) connected to power storage module (M1) as the connection candidate to be turned on when the estimated upper limit value is less than the upper limit value before the turning-on of switch (RY1).

This makes it is possible to statically predict whether the current to be supplied entirely from the plurality of power storage modules (M1) to load (60) becomes insufficient.

[Item 5]

Management device (30) of any one of Items 1 to 4, wherein among switches (RY1), a certain switch (RY1) connected to power storage module (M1) with a highest OCV among the plurality of power storage modules (M1) is turned on when the power is started to be supply from the plurality of power storage modules (M1) to load (60), and the connection candidate connected to switch (RY1) to be turned on next is power storage module (M1) with a highest OCV among other power storage modules (M1) connected to the other switches (RY1) in the off state.

This makes it is possible to connect the plurality of power storage modules (M1) in parallel while preventing a shortage of a current to be supplied to load (60).

[Item 6]

Power supply system (10) further includes a plurality of power storage modules (M1) connected in parallel to load (60) via switches (RY1), and management device (30) of any one of Items 1 to 5.

This makes it possible to achieve power supply system (10) that can prevent a shortage of a current to be supplied to load (60) entirely from the plurality of power storage modules (M1) connected in parallel due to connection of unconnected power storage module (M1).

[Item 7]

Power supply system (10) of Item 6, wherein load (60) includes motor (60) of moving body (1), and management device (30) notifies controller (40) in moving body (1) of an upper limit value of current or power allowed to be supplied entirely from the plurality of power storage modules (M1) to motor (60).

This can prevent occurrence of adverse effects such as degradation in acceleration performance of moving body (1).

REFERENCE MARKS IN THE DRAWINGS 1 electric vehicle
10 power supply system
20 battery pack
30 management unit
M1 battery module
E1-En cell
21 voltage measurement unit
22 temperature measurement unit
23 current measurement unit
24 controller
241 SOC-OCV map
25 relay drive unit
31 processor
311 acquisition unit
312 calculation unit
313 determination unit
314 notification unit
32 storage unit
321 SOC-discharge upper limit current map
40 vehicle ECU
50 inverter
60 motor
RYc main relay
RY1 pack relay
Rs shunt resistor
T1, T2 temperature sensor

The invention claimed is:

1. A management device that manages a plurality of power storage modules each connected in parallel to a load via a switch, the management device comprising a determination unit that determines, in a state where, within the plurality of power storage modules, the switch connected to each of one or more power storage modules of the plurality of power storage modules is in an on state and the switch connected to each of one or more remaining power storage modules of the plurality of power storage modules is in an off state, whether an upper limit value of current or power allowed to be supplied to the load entirely from the plurality of power storage modules after the switch of one of the one or more remaining power storage modules is turned on, is less than or equal to a prior value of the current or the power before turning on of the switch of the one of the one or more remaining power storage modules, and upon determining that the upper limit value is less than or equal to the prior value, does not permit the switch of the one of the one or more remaining power storage modules in the off state to be turned on.

2. The management device according to claim 1, further comprising:

an acquisition unit that acquires at least states of charge of the plurality of power storage modules; and a calculation unit that estimates the upper limit value of the current or the power allowed to be supplied entirely from the plurality of power storage modules to the load, based on SOC-discharge upper limit characteristics that define a relationship between the states of charge of the plurality of power storage modules and upper limit values of currents or power allowed to be discharged from the plurality of power storage modules, wherein in the SOC-discharge upper limit characteristics, an upper limit value of current or power allowed to be discharged from the plurality of power storage modules decreases as a state of charge of the plurality of power storage modules decreases.

3. The management device according to claim 2, wherein the acquisition unit acquires an open circuit voltage of one of the one or more remaining power storage module as a connection candidate, the calculation unit derives the upper limit value of the current or the power allowed to be discharged from the power storage module as the connection candidate, based on the SOC-discharge upper limit characteristics and a state of charge of the one or more power storage module modules connected to the load, and estimates a closed circuit voltage of the connection candidate when discharging is performed from the connection candidate at the upper limit values estimated, and the determination unit does not permit the switch connected to the connection candidate to be turned on when the open circuit voltage of the connection candidate is lower than the closed circuit voltage estimated of the connection candidate.

4. The management device according to claim 2, wherein the calculation unit estimates, based on the SOC-discharge upper limit characteristics, a state of charge of the one or more power storage modules connected to the load, and a state of charge of one of the one or more remaining power storage modules as a connection candidate, the upper limit value of the current or the power allowed to be supplied to the load entirely from the plurality of power storage modules when the state of charge of the one or more power storage modules connected to the load corresponds to the state of charge of the connection candidate after the switch connected to the connection candidate is turned on, and the determination unit does not permit the switch connected to the connection candidate to be turned on when the upper limit value estimated is less than an upper limit value before the turning on of the switch connected to the connection candidate.

5. The management device according to claim 2, wherein:

when the power is started to be supplied from the plurality of power storage modules to the load, the switch connected to a power storage module with a highest open circuit voltage among the plurality of power storage modules is turned on, and a connection candidate of which the switch to be turned on next is the power storage module with the highest open circuit voltage among the one or more remaining power storage modules each of which the switch is in the off state.

6. A power supply system comprising:

the management device according to claim 1; and the plurality of power storage modules connected in parallel to the load via the switch.

7. The power supply system according to claim 6, wherein:

the load includes a motor of a moving body, and the management device notifies a controller in the moving body of an upper limit value of current or power allowed to be supplied entirely from the plurality of power storage modules to the motor.

* * * * *